(12) United States Patent
Fujiwara

(10) Patent No.: US 7,573,663 B2
(45) Date of Patent: Aug. 11, 2009

(54) MASTER CARRIER FOR MAGNETIC TRANSFER, MAGNETIC TRANSFER APPARATUS, AND MAGNETIC TRANSFER METHOD

(75) Inventor: Naoto Fujiwara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 462 days.

(21) Appl. No.: 11/077,125

(22) Filed: Mar. 11, 2005

(65) Prior Publication Data
US 2005/0207047 A1 Sep. 22, 2005

(30) Foreign Application Priority Data
Mar. 18, 2004 (JP) ............... 2004-077593

(51) Int. Cl.
G11B 5/86 (2006.01)
G11B 5/66 (2006.01)
(52) U.S. Cl. ..................... 360/17; 428/835.2
(58) Field of Classification Search ............ 428/825.1, 428/826, 833.2, 833.3, 833.5, 835, 835.2, 428/835.7, 64.6, 65.8, 422; 360/15, 16, 17; 384/492
See application file for complete search history.

(56) References Cited

U.S. PATENT DOCUMENTS

| | | | | |
|---|---|---|---|---|
| 5,690,838 | A * | 11/1997 | Moriguchi et al. | 360/131 |
| 6,636,371 | B1 * | 10/2003 | Komatsu et al. | 360/16 |
| 2002/0141088 | A1 * | 10/2002 | Nishikawa et al. | 360/17 |
| 2003/0099416 | A1 * | 5/2003 | Kinno et al. | 384/492 |
| 2003/0152808 | A1 * | 8/2003 | Noguchi et al. | 428/826 |

FOREIGN PATENT DOCUMENTS

| | | |
|---|---|---|
| JP | 10-275435 | 10/1998 |
| JP | 2002-251722 | 9/2002 |
| JP | 2003-178440 | 6/2003 |

OTHER PUBLICATIONS

WO 99/33918 Kobayashi (PCT/US/98/27428).*
Translation JP 2003-178440 (JP document publication date Jun. 27, 2003).*
Translation JP 2002-251722 (JP document publication date Sep. 6, 2002).*
Translation JP 10-275435 (JP document publication date Oct. 13, 1998).*

* cited by examiner

*Primary Examiner*—Kevin M. Bernatz
*Assistant Examiner*—Louis Falasco
(74) *Attorney, Agent, or Firm*—Sughrue Mion, PLLC

(57) ABSTRACT

A master for magnetic transfer is provided that obtains favorable close contact with a slave medium, is capable of good positioning therewith, and prevents positional misalignment, damage, and separation failures. The master carrier is formed to have surface properties such that a frictional characteristic value F/P·A is within a range from 173 to 24/cm², and preferably within a range from 112 to 45/cm², when the master carrier and the slave medium are placed in uniform close contact with a contact area A, a vertical load P is applied, the master carrier and the slave medium are pulled in their planar directions, and the maximum static friction at this time is designated as F. It is also preferable that a hard protective layer of DLC film is formed on the surface of the master carrier, and that a lubricant is provided on the hard protective layer, as necessary.

15 Claims, 2 Drawing Sheets

MASTER CARRIER FOR MAGNETIC TRANSFER, MAGNETIC TRANSFER APPARATUS, AND MAGNETIC TRANSFER METHOD

BACKGROUND OF THE INVENTION

1. Field of the Invention

The present invention relates to a master carrier for magnetic transfer, a magnetic transfer apparatus, and a magnetic transfer method, which are employed in magnetic transfer, which is realized by placing a master carrier bearing transfer information, and a slave medium in close contact.

2. Description of the Related Art

Magnetic transfer, which is the subject of the present invention, is a process by which magnetic patterns are transferred and recorded onto slave media. The transfer and recording are realized by placing a master carrier (patterned master) having an uneven transfer pattern, for example, servo signals in the form of protrusions and recesses, which has a magnetic layer at least on its surface in close contact with a slave medium having a magnetic recording portion. A transfer magnetic filed is applied to the master carrier and the slave medium in this state of close contact, and a magnetic pattern corresponding to the information borne by the master carrier is transferred and recorded onto the slave medium.

In the case that the slave medium is a discoid medium, such as a hard disk or a high density flexible disk, the master carrier is also of a discoid shape. The transfer pattern is formed as a concentric pattern on the discoid master carrier. The master carrier is placed into close contact with a single side of the slave medium, or two master carriers are placed into close contact with both sides of a slave medium. A magnetic field applying device, comprising electromagnets or permanent magnets, is provided on either one or both sides of the master carrier and the slave medium in this state of close contact, and a transfer magnetic field is applied (refer to U.S. Pat. No. 6,636,371, for example).

In order to improve the transfer quality of the above magnetic transfer, it is necessary that the interval between the surfaces of the master carrier and the slave medium is uniform. The master carrier and the salve medium are placed in close contact for this reason. During close contact, the entirety of the surfaces must be in uniform close contact, and positional displacement must not occur.

If the master carrier and the slave medium move relatively in a sliding manner when they are placed in close contact, desired signals cannot be transferred and recorded at predetermined positions. In the case that the signals are servo signals, sufficient tracking functions cannot be obtained, thereby decreasing the reliability of the finished product. In addition, the master carrier may become contaminated, or the surfaces of the master carrier and the slave medium may become damaged. This is due to the friction that occurs between the master carrier and the slave medium during their relative sliding motion while a close contacting force is applied thereto.

Meanwhile, after magnetic transfer is completed, the close contact between the master carrier and the slave medium is released, and they are separated from each other. However, if the degree of close contact between the master carrier and the slave medium is excessive, there are cases in which loads are applied on the master carrier and the slave medium, causing damage thereto. That is, it is necessary that the master carrier and the slave medium does not slide to cause positional displacement when they are placed into close contact. Yet, close contact states that do not allow any sliding at all cause problems during separation.

Master carriers, which are the subject of the present invention, comprise uneven patterns formed by protrusions and recesses. The close contact friction properties differ according to the degree of unevenness and other surface properties. However, it is unknown what manner of surface properties would enable favorable close contact states with slave media.

SUMMARY OF THE INVENTION

The present invention has been developed in view of the points described above. It is an object of the present invention to provide a master carrier for magnetic transfer, a magnetic transfer apparatus, and a method for magnetic transfer, which are capable of obtaining favorable close contact states and positional alignment with slave media during magnetic transfer, without positional displacement, damage, or problems during separation.

The master carrier for magnetic transfer of the present invention comprises:

a discoid master carrier main body; and a concentric transfer pattern, corresponding to information to be transferred; wherein:

the surface of the master carrier is formed such that a frictional characteristic value $F/P \cdot A$ is within a range from 173 to $24/cm^2$, when the master carrier and a slave medium are placed in uniform close contact with a contact area A, a vertical load P is applied, the master carrier and the slave medium are pulled in their planar directions, and the maximum static friction at this time is designated as F.

It is preferable that the frictional characteristic value $F/P \cdot A$ is within a range from 112 to $45/cm^2$.

It is preferable that a hard protective layer of DLC or Sputter Carbon is formed on the surface of the master carrier. It is further preferable that a lubricant is provided on the hard protective layer of DLC film.

The magnetic transfer apparatus of the present invention comprises:

a close contacting means, for placing the surface of a master carrier and a magnetic recording medium, which is a slave medium, in close contact with each other; and a transfer magnetic field applying means, for applying a transfer magnetic field to the master carrier and the slave medium, which are in close contact with each other, thereby transferring information borne on the surface of the master carrier to the slave medium; wherein:

the master carrier for magnetic transfer of the present invention is employed as the master carrier.

The method for magnetic transfer of the present inveniton comprises the steps of:

placing the surface of a master carrier and a magnetic recording medium, which is a slave medium, in close contact with each other; and applying a transfer magnetic field to the master carrier and the slave medium, which are in close contact with each other, thereby transferring information borne on the surface of the master carrier to the slave medium; wherein:

the master carrier for magnetic transfer of the present invention is employed as the master carrier; and the magnetic transfer apparatus of the present invention is employed as a magnetic transfer apparatus.

According to the present invention as described above, a master carrier is employed that has a frictional characteristic value $F/P \cdot A$ within the range from 173 to $24/cm^2$, when the contact area is A, the vertical load is P, and the maximum static frictional force is F. Thereby, damage that occurs, due to positional displacement when the master carrier and the slave medium are placed in close contact for magnetic transfer, is prevented. In addition, accurate positioning is enabled, and separation of the master carrier and the slave medium following magnetic transfer can also be performed favorably.

That is, if the frictional characteristic value F/P·A is less than 24/cm$^2$, positional displacement occurs and problems associated with damage are generated. That is, the durability of the slave medium deteriorates, faulty slave media are produced, and the reliability of the slave media deteriorates. On the other hand, if the frictional characteristic value F/P·A exceeds 173/cm$^2$, the close contact force between the master carrier and the slave medium becomes great. This close contact force poses obstacles during separation of the master carrier and the slave medium, following magnetic transfer. That is, there arises a possibility that damage will occur, and cause problems in production efficiency.

In cases that the design of the master carrier is altered, by providing a hard protective layer, a lubricant, or the like, by setting the frictional characteristic value F/P·A to be within the above range, master carriers, which are appropriate for magnetic transfer, can be designed.

DESCRIPTION OF THE PREFERRED EMBODIMENTS

Figure 1A:
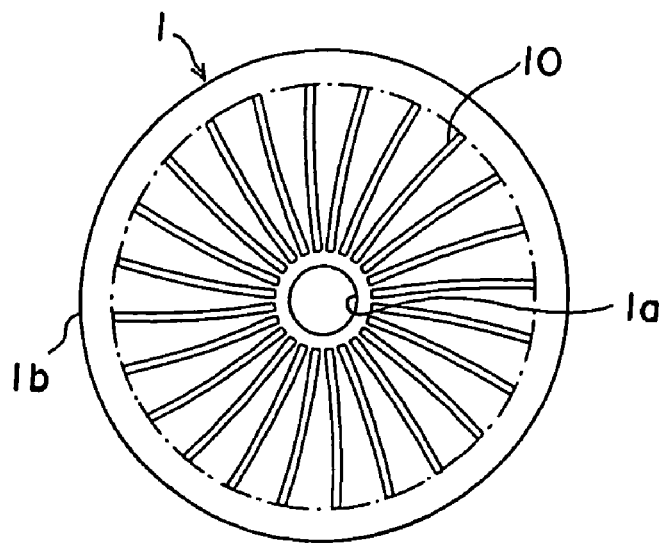
FIG. 1A is a plan view of a master carrier for magnetic transfer according to an embodiment of the present invention.
Figure 1B:
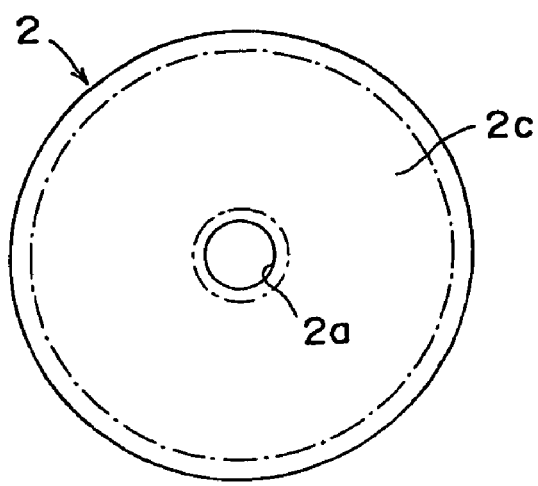
FIG. 1B is a plan view of a slave medium.
Figure 2:
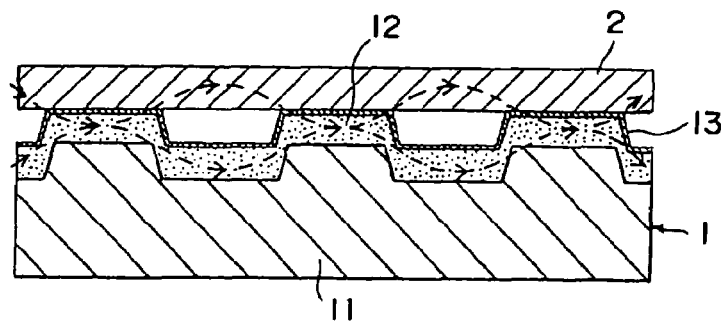
FIG. 2 is a partial sectional view of the master carrier and the slave medium in a state of close contact.
Figure 3:
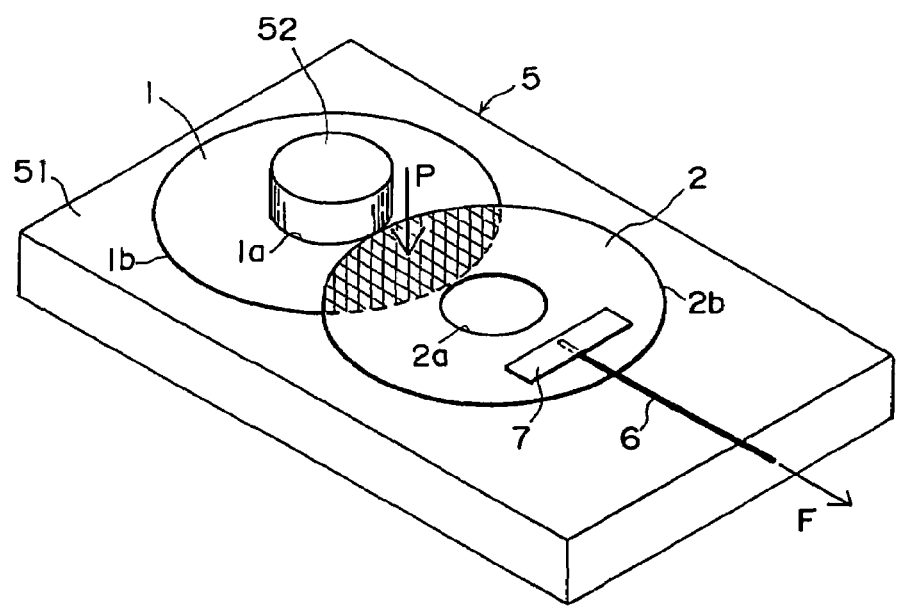
FIG. 3 is a schematic perspective view of a frictional coefficient measuring device.

Hereinafter, an embodiment of the present invention will be described in detail. FIG. 1A is a plan view of a master carrier 1 for magnetic transfer according to an embodiment of the present invention, and FIG. 1B is a plan view of a slave medium 2. FIG. 2 is a partial sectional view of the master carrier 1 and the slave medium 2 in a state of close contact. FIG. 3 is a schematic perspective view of a frictional coefficient measuring device. Note that the figures are model drawings, and dimensions therein are drawn at different ratios than the actual ratios thereof.

As illustrated in FIG. 1, the master carrier 1 is formed in a discoid shape, having a central aperture 1a and an outer peripheral portion 1b. A transfer pattern 10 is formed in an annular region that excludes the inner peripheral portion and the outer peripheral portion of one side (information bearing surface) of the master carrier 1.

In the case that the transfer information is servo signals, the transfer pattern 10 is formed as a servo pattern. The servo pattern is formed as a concentric pattern in thin regions that extend radially outward (slightly arcuate in FIG. 1A) from the central portion of the master carrier 1, at equidistant intervals.

The slave medium 2 is formed in a discoid shape, having a central aperture 2a. An annular region that excludes the inner peripheral portion and the outer peripheral portion is set as a recording region 2c where recording/reproduction is performed. The recording region 2c is the region in which a head moves to read out and write information. The recording region 2c is placed into close contact with the transfer pattern 10, and a magnetic pattern corresponding to the transfer pattern 10 is transferred and recorded thereon.

The master carrier 1 comprises a master substrate 11, on the surface of which an uneven pattern of protrusions and recesses is formed by electroforming Ni or the like. A magnetic layer 12 is coated on the surface of the uneven pattern. Further, a hard protective layer 13 of DLC film or sputtered carbon film is coated on the surface. Lubricants are provided as necessary, to adjust the frictional coefficient during close contact with the slave medium 2.

The master carrier 1 and the slave medium 2 are placed in close contact with a contact area A, and a vertical load P. The master carrier and the slave medium are pulled in their planar directions in this state, and the maximum static friction at this time is designated as F. The master carrier 1 of the present invention is characterized in that the surface is formed such that a frictional characteristic value F/P·A, which is the maximum static frictional force F divided by the product of the vertical load P and the contact area A is within a range of 173 to 24/cm$^2$. Preferably, the frictional characteristic value F/P·A is within a range of 112 to 45/cm$^2$.

The frictional characteristic value F/P·A is measured as illustrated in FIG. 3. The frictional coefficient measuring device illustrated in FIG. 3 comprises a stage 5, which is formed by a flat surface 51 and a support shaft 52, for holding the master carrier. The shaft 52 is inserted through the central aperture 1a of the master carrier 1 to fix the master carrier 1 on the stage 5.

Meanwhile, a portion of the slave medium 2 is placed atop the master carrier 1 so as to slidably overlap therewith with a contact area A. A vertical load P is applied to place the slave medium 2 and the master carrier 1 in uniform close contact. Then, the slave medium 2 is pulled in a planar direction parallel to the surfaces in close contact while gradually increasing the pulling load. The maximum static frictional force F is measured at the point in time at which the slave medium 2 begins to move, and the frictional characteristic value F/P·A is derived.

Specifically, the tip of a rod 6 (or a wire) is fixed to the slave medium with a fixing member 7. The other end of the rod 6 is connected to a pulling mechanism (not shown), which is capable of measuring a pulling load. The pulling mechanism is set such that the slave medium 2 is pulled in a direction parallel to the closely contacted surfaces (disk surfaces), in a state in which it does not contact the stage 5. The pulling load is applied at a uniform speed (0.4 mm/sec, for example).

During actual measurement, the slave medium 2 is placed on the surface of the master carrier 1, which is held by the support shaft 52, with the center position thereof shifted such that the slave medium does not interfere with the support shaft 52. In this case, the contact area A (the cross hatched portion in FIG. 3), surrounded by the outer periphery of the master carrier 1 and the outer periphery of the slave medium 2 was 7.1 cm$^2$. Then, a weight having a mass of 30.74 g is placed on the contact area A to apply the vertical load P. The vertical load P in this case is 0.30N, and the close contact pressure is 41.9 mN/cm$^2$.

Alternatively, measurement can be performed by fixing the slave medium 2 to the stage 5, and pulling the master carrier 1.

The results of measurement of the frictional characteristic value F/P·A for master carriers 1 of the present invention are listed in Table 1. The maximum static frictional force F, the frictional characteristic values F/P·A, and evaluation results are listed in Table 1. The evaluation results are: results of evaluations of damage by friction due to sliding of the slave media 2, obtained by observing the surface of the slave media 2 after measurement of the maximum static frictional force; and results of evaluations of separation properties after each of samples 1 through 16 and the slave media 2 were placed into close contact with a predetermined close contact force.

Samples 1 through 4 are master carriers having FeCo magnetic layers 12 coated on the surface of their substrates 11, on which the uneven patterns have been formed. Hard disks were utilized as the slave media 2.

Samples 5 through 8 are master carriers having FeCo magnetic layers 12 coated on the surface of their substrates 11, on which the uneven patterns have been formed. In addition, hard protective layers 13 of DLC film are provided on the surface of the FeCo magnetic layers. Hard disks were utilized as the slave media 2.

Samples 9 through 12 are master carriers having FeCo magnetic layers 12 coated on the surface of their substrates 11, on which the uneven patterns have been formed. In addition, hard protective layers 13 of sputtered carbon film are provided on the surface of the FeCo magnetic layers. Hard disks were utilized as the slave media 2.

Samples 13 through 16 are master carriers having FeCo magnetic layers 12 coated on the surface of their substrates 11, on which the uneven patterns have been formed. In addition, hard protective layers 13 of DLC film are provided on the surface of the FeCo magnetic layers. Further, lubricants (PFPE, at a thickness of 1 nm) are provided on the surface of the DLC film. Hard disks were utilized as the slave media 2.

The film forming conditions of the magnetic layers 12 of samples 1 through 16 are as follows. Film thickness: 175 nm (in the case that L/S=100 nm); distance ts between target and substrate: 200 mm; DC power: 1.5 kV; and pressure: 0.08 Pa (Ar=12 sccm). The film forming conditions of the DLC film for samples 5 through 8 and samples 13 through 16 are as follows. Process gas: Ar=24 sccm, HCESAr: 7 sccm, ethylene: 5 sccm; acceleration voltage: 95V; anode current: 7.0 A; magnet current: 6.5 A; and film thickness: 10 nm or less.

TABLE 1

| | Maximum Static Frictional Force: F (N) | Frictional Characteristic Value: F/P·A (/cm$^2$) | Evaluation Results | |
|---|---|---|---|---|
| | | | Surface Damage | Separation Properties |
| Sample 1 | 368 | 173 | Good | Fair |
| Sample 2 | 333 | 156 | Good | Fair |
| Sample 3 | 238 | 112 | Good | Good |
| Sample 4 | 171 | 80 | Good | Good |
| Sample 5 | 157 | 74 | Good | Good |
| Sample 6 | 134 | 63 | Good | Good |
| Sample 7 | 124 | 58 | Good | Good |
| Sample 8 | 85 | 40 | Good | Good |
| Sample 9 | 141 | 66 | Good | Good |
| Sample 10 | 168 | 79 | Good | Good |
| Sample 11 | 185 | 87 | Good | Good |
| Sample 12 | 159 | 75 | Good | Good |
| Sample 13 | 95 | 45 | Good | Good |
| Sample 14 | 72 | 34 | Fair | Good |
| Sample 15 | 65 | 31 | Fair | Good |
| Sample 16 | 50 | 24 | Fair | Good |

As can be seen in Table 1, master carriers 1 having frictional characteristic values F/P·A within the range of 173 to 24/cm$^2$ provided favorable results. Further favorable results were obtained by master carriers 1 having frictional characteristic values F/P·A within the range of 112 to 45/cm$^2$.

If the frictional characteristic value F/P·A is less than 24/cm$^2$ (preferably 45/cm$^2$), positional displacement occurs and problems associated with damage are generated. That is, the durability of the slave medium deteriorates, and faulty slave media are produced. On the other hand, if the frictional characteristic value F/P·A exceeds 173/cm$^2$ (preferably 112/cm$^2$), the close contact force between the master carrier and the slave medium becomes great. This close contact force causes difficulties during separation of the master carrier and the slave medium, following close contact therebetween.

Note that nickel, silicon, quartz plates, glass, aluminum, alloys, ceramics, synthetic resins and the like are utilized as the material of the substrate 11 of the master carrier 1. The uneven pattern is formed by the stamper method or the like. The magnetic layer 12 is formed by a vacuum film forming method, such as vacuum vapor deposition, sputtering, and ion plating. Alternatively, a plating method may be employed. Substantially the same master carriers 1 are utilized in both planar and vertical recording.

A discoid magnetic recording medium, such as a hard disk and a high density flexible disk, on one side or both sides of which a magnetic layer is formed, is utilized as the slave medium 2. The magnetic layer may be a coating type magnetic recording layer, or a metallic thin film type magnetic recording layer.

A magnetic transfer apparatus (not shown) that performs magnetic transfer utilizing the master carrier 1 comprises a transfer holder in the form of a chamber, constituted by a base holder and a pressing holder which are capable of moving toward and away from each other. The slave medium 2 and two master carriers 1, provided on both sides of the slave medium 2, are placed within the hermetically sealable interior space of the transfer holder. The master carriers 1 and the slave medium 2 are placed in close contact with each other, a transfer magnetic field is applied, and magnetic transfer is performed. Support shafts are provided at the center positions of the rear surfaces of the base holder and the pressing holder. The support shafts are supported by the apparatus main body, linked to a rotating mechanism. The transfer holder is driven to rotate during magnetic transfer.

The interior space of the transfer holder is depressurized to a predetermined degree of vacuum during close contact of the master carriers 1 and the slave medium 2. Thereby, a close contacting force is obtained, and air is removed from the closely contacted surfaces, to improve the close contacting properties. Compressed air is introduced into the transfer holder when it is opened to the atmosphere and during separation of the master carriers 1 and the slave medium 2. Mechanical pressure may also be applied to the transfer holder from the exterior, in addition to the vacuum suction, to apply the close contacting force.

A magnetic field applying device, for applying the transfer magnetic field in the case of planar recording, comprises: two ring type head electromagnets having gaps that extend in the radial direction thereof. The two ring type head electromagnets are provided on both sides of the transfer holder. Magnetic fields, generated parallel to a track direction (indicated by the arrow in FIG. 2), are applied in the same direction from both sides of the transfer holder. The transfer holder is rotated such that the transfer magnetic field is applied across the entirety of the surfaces of the master carriers 1 and the slave medium 2. In the case of vertical recording, electromagnets or permanent magnets of different polarities are provided on both sides of the transfer holder. A transfer magnetic field is generated and applied in a direction perpendicular to the transfer folder. In the case that the magnetic field is only generated across a portion of the transfer holder, either the transfer holder or the magnetic field is moved, to perform magnetic transfer across the entirety of the surfaces of the master carriers 1 and the slave medium 2.

A magnetic transfer method is that in which the same master carriers 1 are employed to perform magnetic transfer continuously on a plurality of slave media 2. Therefore, the master carriers 1 are positioned and held in the transfer holder. The transfer holder is opened, and the slave medium 2, which has been initially magnetized in either the planar or the vertical direction, is set in the transfer holder after aligning its center position. Then, the transfer holder is closed. Next, the interior space of the transfer holder is sealed, and a uniform close contacting force is applied to the slave medium 2 and the master carriers 1, to place them in close contact with each other.

Thereafter, the magnetic field applying device is caused to approach the transfer holder, and the transfer magnetic field is applied in a direction substantially opposite that of the initial magnetization of the slave medium 2, while rotating the transfer holder. The transfer magnetic field is absorbed by the protrusions of the uneven pattern formed by the magnetic layer on the master carriers 1, which are in close contact with the slave medium. In the case of planar recording, the initial magnetizations of these portions are not reversed, whereas the initial magnetizations of other portions are reversed. In the case of vertical recording, the initial magnetizations of these portions are reversed, and the initial magnetizations of other portions are not reversed. As a result, magnetic patterns corresponding to the transfer pattern of the master carriers 1 are transferred and recorded on the slave medium. Following magnetic transfer, the transfer holder is opened, and the slave medium 2, to which magnetic transfer has been performed, is removed and conveyed. Then, a next slave medium 2 is supplied, and the magnetic transfer described above is repeated.

Note that the present invention is not limited to the embodiment described above. Various changes and modifications are possible, within the scope of the invention hereinafter claimed.

What is claimed is:

1. A master carrier for magnetic transfer, comprising:
    a discoid master carrier main body; and
    an uneven concentric transfer pattern formed by protrusion and recesses, corresponding to information to be transferred; wherein:
    the surface of the master carrier is formed such that a frictional characteristic value $F/P \cdot A$ is within a range from 112 to $45/cm^2$, when the master carrier and a slave medium are placed in uniform close contact with a contact area A, a vertical load P is applied, the master carrier and the slave medium are pulled in their planar directions, and a maximum static friction during said pulling is designated as F.

2. A master carrier for magnetic transfer as defined in claim 1, wherein:
    a hard protective layer of DLC film is formed on the surface of the master carrier.

3. A master carrier for magnetic transfer as defined in claim 1, wherein:
    a hard protective layer of DLC film is formed on the surface of the master carrier.

4. A master carrier for magnetic transfer as defined in claim 2, wherein:
    a lubricant is provided on the hard protective layer of DLC film.

5. A master carrier for magnetic transfer as defined in claim 3, wherein:
    a lubricant is provided on the hard protective layer of DLC film.

6. A magnetic transfer apparatus comprising:
    a close contacting means, for placing the surface of a master carrier and a magnetic recording medium, which is a slave medium, in close contact with each other; and
    a transfer magnetic field applying means, for applying a transfer magnetic field to the master carrier and the slave medium, which are in close contact with each other, thereby transferring information borne on the surface of the master carrier to the slave medium; wherein:
    the master carrier for magnetic transfer as defined in claim 1 is employed as the master carrier.

7. A magnetic transfer apparatus comprising:
    a close contacting means, for placing the surface of a master carrier and a magnetic recording medium, which is a slave medium, in close contact with each other; and
    a transfer magnetic field applying means, for applying a transfer magnetic field to the master carrier and the slave medium, which are in close contact with each other, thereby transferring information borne on the surface of the master carrier to the slave medium; wherein:
    the master carrier for magnetic transfer as defined in claim 2 is employed as the master carrier.

8. A magnetic transfer apparatus comprising:
    a close contacting means, for placing the surface of a master carrier and a magnetic recording medium, which is a slave medium, in close contact with each other; and
    a transfer magnetic field applying means, for applying a transfer magnetic field to the master carrier and the slave medium, which are in close contact with each other, thereby transferring information borne on the surface of the master carrier to the slave medium; wherein:
    the master carrier for magnetic transfer as defined in claim 3 is employed as the master carrier.

9. A magnetic transfer apparatus comprising:
    a close contacting means, for placing the surface of a master carrier and a magnetic recording medium, which is a slave medium, in close contact with each other; and
    a transfer magnetic field applying means, for applying a transfer magnetic field to the master carrier and the slave medium, which are in close contact with each other, thereby transferring information borne on the surface of the master carrier to the slave medium; wherein:
    the master carrier for magnetic transfer as defined in claim 4 is employed as the master carrier.

10. A magnetic transfer apparatus comprising:
    a close contacting means, for placing the surface of a master carrier and a magnetic recording medium, which is a slave medium, in close contact with each other; and
    a transfer magnetic field applying means, for applying a transfer magnetic field to the master carrier and the slave medium, which are in close contact with each other, thereby transferring information borne on the surface of the master carrier to the slave medium; wherein:
    the master carrier for magnetic transfer as defined in claim 5 is employed as the master carrier.

11. A method for magnetic transfer, comprising:
    placing the surface of a master carrier and a magnetic recording medium, which is a slave medium, in close contact with each other; and
    applying a transfer magnetic field to the master carrier and the slave medium, which are in close contact with each other, thereby transferring information borne on the surface of the master carrier to the slave medium; wherein:
    the master carrier and the magnetic transfer apparatus defined in claim 6 are employed as the master carrier and as the magnetic transfer apparatus, respectively.

12. A method for magnetic transfer, comprising:
    placing the surface of a master carrier and a magnetic recording medium, which is a slave medium, in close contact with each other; and applying a transfer magnetic field to the master carrier and the slave medium, which are in close contact with each other, thereby transferring information borne on the surface of the master carrier to the slave medium; wherein:

the master carrier and the magnetic transfer apparatus defined in claim 7 are employed as the master carrier and the magnetic transfer apparatus, respectively.

13. A method for magnetic transfer, comprising:

placing the surface of a master carrier and a magnetic recording medium, which is a slave medium, in close contact with each other; and applying a transfer magnetic field to the master carrier and the slave medium, which are in close contact with each other, thereby transferring information borne on the surface of the master carrier to the slave medium; wherein:

the master carrier and the magnetic transfer apparatus defined in claim 8 are employed as the master carrier and the magnetic transfer apparatus, respectively.

14. A method for magnetic transfer, comprising:

placing the surface of a master carrier and a magnetic recording medium, which is a slave medium, in close contact with each other; and applying a transfer magnetic field to the master carrier and the slave medium, which are in close contact with each other, thereby transferring information borne on the surface of the master carrier to the slave medium; wherein:

the master carrier and the magnetic transfer apparatus defined in claim 9 are employed as the master carrier and the magnetic transfer apparatus, respectively.

15. A method for magnetic transfer, comprising:

placing the surface of a master carrier and a magnetic recording medium, which is a slave medium, in close contact with each other; and applying a transfer magnetic field to the master carrier and the slave medium, which are in close contact with each other, thereby transferring information borne on the surface of the master carrier to the slave medium; wherein:

the master carrier and the magnetic transfer apparatus defined in claim 10 are employed as the master carrier and the magnetic transfer apparatus, respectively.

* * * * *